United States Patent [19]

Angott

[11] Patent Number: 4,654,541
[45] Date of Patent: Mar. 31, 1987

[54] LAMP DIMMER CASING

[75] Inventor: Paul G. Angott, Troy, Mich.

[73] Assignee: Clifford G. Dimmitt, Troy, Mich.

[21] Appl. No.: 827,355

[22] Filed: Feb. 7, 1986

[51] Int. Cl.$^4$ .............................................. H05B 37/00
[52] U.S. Cl. ..................................... 307/147; 307/112;
307/114; 315/194; 315/200 R; 200/61.03;
200/51.14; 339/34; 339/176 L
[58] Field of Search ............... 307/112, 113, 114, 115,
307/116, 117, 147, 125, 146, 141.4; 315/194,
200 R, 200 A, 313; 339/20, 1 L, 17 D, 31 L, 59
L, 61 L, 83, 93 L, 94 L, 97 L, 102 L, 110 L, 113
L, 34, 155 L, 154 L, 176 L; 200/51.09, 51.03,
51.05, 51.14; 362/241, 247

[56] References Cited
U.S. PATENT DOCUMENTS

| 2,072,389 | 3/1937 | Stayton | 307/114 |
| 2,985,729 | 5/1961 | Lambert | 200/51.14 |
| 3,234,342 | 2/1966 | Murray | 307/114 X |
| 3,430,101 | 2/1969 | Bitz | 315/194 |
| 3,450,941 | 6/1969 | Butts | 315/194 |
| 3,496,451 | 2/1970 | Duncan | 315/194 X |
| 3,543,088 | 11/1970 | Garrett | 315/200 R X |
| 3,781,593 | 12/1973 | Rodriguez | 315/194 X |
| 3,893,019 | 7/1975 | King et al. | 315/194 X |
| 3,896,334 | 7/1975 | Rodriguez | 339/176 L X |
| 3,971,028 | 7/1976 | Funk | 315/159 X |
| 3,971,611 | 7/1976 | Rose | 339/34 |
| 4,023,035 | 5/1977 | Rodriguez | 315/159 X |
| 4,090,107 | 5/1978 | Seib | 307/311 X |
| 4,258,293 | 3/1981 | Judge et al. | 315/200 R X |
| 4,365,237 | 12/1982 | Knight | 200/61.03 X |

Primary Examiner—William M. Shoop, Jr.
Assistant Examiner—Shik Luen Paul Ip
Attorney, Agent, or Firm—Reising, Ethington, Barnard, Perry & Milton

[57] ABSTRACT

A remotely controlled assembly (10) for controlling the electrical power to an electrical load having an electrical circuit (14) for controlling the electrical power supply to the electrical load in response to a predetermined female threadable radio signal which is supported by a housing (16) which has a receptacle contact (38) for receiving the electrical load and a male threadable contact (42) for securing the housing (16) in an electrical receptacle for receiving power.

8 Claims, 5 Drawing Figures

LAMP DIMMER CASING

TECHNICAL FIELD

The subject invention relates to a housing mounted in an electrical receptacle and, particularly, a housing for supporting a remotely controlled circuit threadably removable in an electrical receptacle.

BACKGROUND ART

Lamps are usually controlled by a wall-mounted switch. Such controls make it necessary to be at the location of the switch in order to operate the lamp.

STATEMENT OF INVENTION AND ADVANTAGES

A remotely controlled assembly of the subject invention is used for controlling the electrical power to an electrical load. A control means is utilized for controlling the electrical power supply to the electrical load in response to a predetermined radio signal. A housing means supports the control means and includes a receptacle means for receiving the electrical load and a male means for securing the housing means in an electrical receptacle for receiving power.

Accordingly, a light bulb or electrical load utilizing the subject invention may be substituted for the existing light bulb or electrical load in an electrical receptacle. By securing the subject invention in any conventional lamp receptacle, mobility may be achieved since the subject invention may be moved from room to room. The power to an electrical load may be operated from any location within a predetermined radial distance from the electrical load, thereby further enhancing mobility of the operator.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
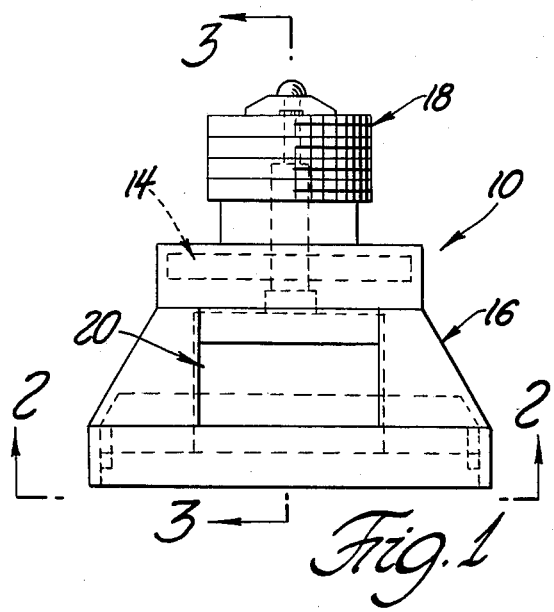
FIG. 1 is a front view of the invention.

With reference to FIG. 1, a remotely controlled assembly utilizing the subject invention is generally shown at 10. The assembly 10 includes control means 14 for controlling the electrical power supply to an electical load (not shown) in response to a predetermined radio signal. The electrical load consists or a conventional incandescent light bulb in a lamp such that the bulb is above the plane of the assembly 10. Thus, the assembly 10 in FIG. 1 would be turned 180°. The assembly also includes a casing or housing means 16 for supporting the control means 14. The housing means 16 includes receptacle means 20 for receiving the electrical load and a male means 18 for securing the housing means 16 in an electrical receptacle for receiving power. In other words, the housing means 16 has a male means 18 similar to a conventional light bulb for securing into an electrical receptacle of a conventional lamp which is of a type well known in the art for supplying electrical power, and receptacle means 20 similar to a conventional receptacle outlet for receiving an electrical load such as an incandescent light bulb.

Figure 2:
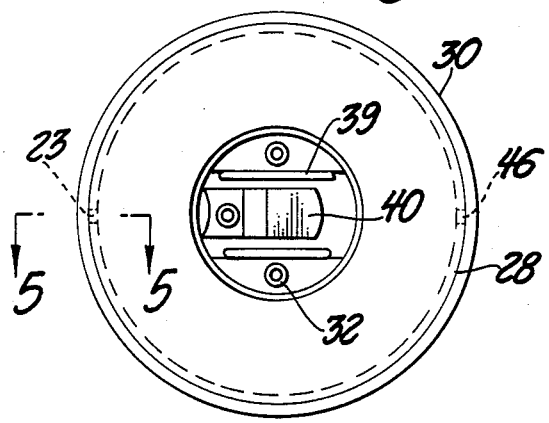
FIG. 2 is a bottom view of the invention taken along line 2—2 of FIG. 1.
Figure 3:
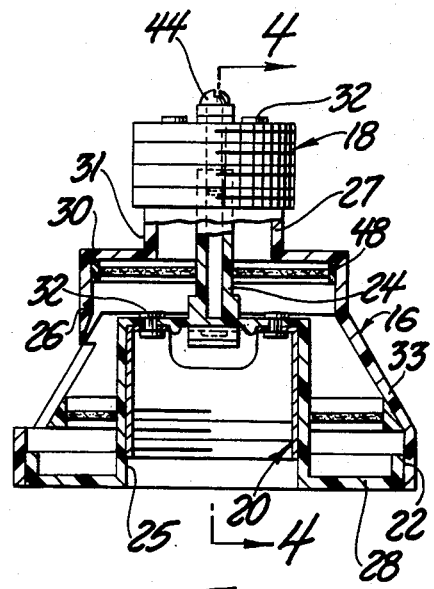
FIG. 3 is a cross-sectional view of the invention taken substantially along line 3—3 of FIG. 1.
Figure 5:
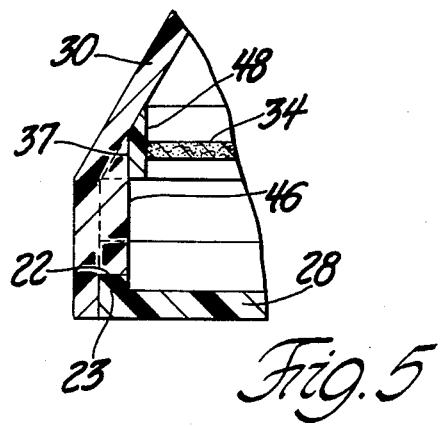
FIG. 5 is an enlarged fragmentary cross-sectional view taken substantially along line 5—5 of FIG. 2.
Figure 4:
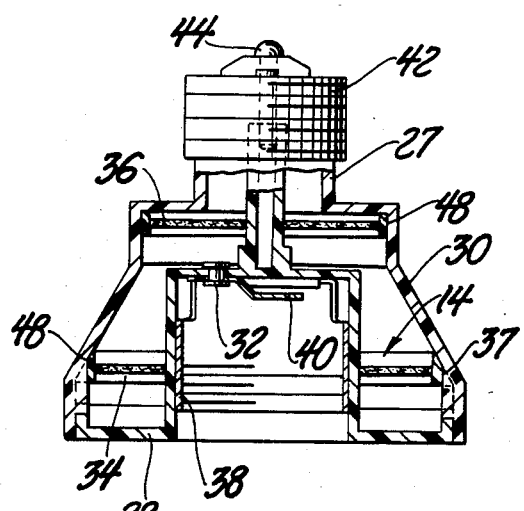
FIG. 4 is a cross-sectional view of the invention taken substantially along line 4—4 of FIG. 3.

With reference to FIGS. 3 and 4, the housing 16 includes a female member 28 having a periphery 22 with a centrally disposed cylindrical receptacle pocket 25 for receiving the receptacle means 20. The female member 28 includes a centrally disposed stem 24 extending away from the pocket 25. The housing 16 also includes a male member 30 having a centrally disposed cylindrical base 26 with a centrally disposed cylindrical stem 31 which extends away from the base 26 to which the male means 18 is mounted. The male member 30 includes a frustoconical portion 33 extending from the base 26 opposite the stem 31, and a centrally disposed pocket 27 within the stem 31 for receiving the stem 24 of the female member 28. With reference to FIG. 2, the male member 30 also includes a pair of locating webs 46 for aligning the male member 30 with the female member 28. With reference to FIG. 3, the male member 30 further includes tabs 48 for mounting and securing the control means 14. With reference to FIG. 5, the female member 28 further includes grooves 23 on the periphery 22 for mating with the locating webs 46 of the male member 30 for aligning and nonrotatably securing the female member 28 with the male member 30.

With reference to FIG. 2, the assembly 10 further includes fastening means 32 for securing the male means 18 and receptacle means 20 to the male and female member 30 and 28, respectively. The fastening means 32 includes eyelets 32 for securing the male means 18 and receptacle means 20 to the male member 30 and female member 28, respectively.

With reference to FIG. 4, the control means 28 includes a first printed circuit board 34 and second printed circuit board 36 for regulating the amount of electrical power supplied to an electrical load. The first printed circuit board 34 and second printed circuit board 36 include notches 37 for mating with the tabs 48 of the male member 30 for mounting and securing the boards 34 and 36 inside the male member 30.

The receptacle means 20 includes an internal threadable contact 38 and a flat spring 40 for securing and supplying power to the electrical load. The contact 38 is of a type well-known in the art for securing a conventional incandescent light bulb into a conventional electrical receptacle. The female member 28 includes bars 39 for locating and preventing the rotation of a flat spring 40 about a vertical axis. The male means 18 includes a threadable electrical contact 42 which of a type well-known in the art for securing into the electrical receptacle, and a fastener 44 to secure the female member 28 to the male member 30. In other words, the fastener 44 secures the stem 24 of the female member 28 to the male member 30.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A remotely controlled assembly (10) for controlling the electrical power to an electrical load, said assembly comprising; control means (14) for controlling the electrical power supply to the electrical load in response to a predetermined radio signal, and housing means (16) supporting said control means (14) and including a receptacle means (20) for receiving the electrical load and a male means (18) for securing said housing means (16) in an electrical receptacle for receiving power, said housing means (16) including a female member (28) having a centrally disposed receptacle pocket (25) for receiving said receptacle means (20) and an integral annular portion about said pocket (25) and a periphery (22) extending substantially perpendicularly from said annular portion and a centrally disposed stem (24) extending away from said pocket (25), and a male member (30) having a centrally disposed cylindrical base (26) and a frustoconical portion (33) extending from said base (26) and having an annular flange at the end thereof, said male member (30) including a pair of locating webs (46) extending radially inwardly from said annular flange for aligning said male member (30) with said female member (28), said female member (28) including grooves (23) on said periphery (22) for mating with said locating webs (46) of said male member (30) for aligning and non-rotatably securing said female member (28) within said male member (30).

2. An assembly as set forth in claim 1 wherein said male member (30) further includes tabs (48) for mounting and securing said control means (14).

3. An assembly as set forth in claim 2 further including fastening means (32) for securing said male means (18) and said receptacle means (24) to said male and said female member (30) and (28), respectively.

4. An assembly as set forth in claim 3 wherein said control means (28) includes a first printed circuit board (34) and second printed circuit board (36) for regulating the amount of electrical power supplied to an electrical load.

5. An assembly as set forth in claim 4 wherein said receptacle means (20) includes an internal threadable contact (38) and a flat spring (40) for securing and supplying power to said electrical load.

6. An assembly as set forth in claim 5 wherein said male means (18) includes a threadable electrical contact (42) for securing into said receptacle and a fastener (44) to secure said female member (28) to said male member (30).

7. An assembly as set forth in claim 6 wherein said fastening means (32) includes eyelets (32) for securing said male means (18) and said receptacle means (20) to said male member (30) and said female member (28), respectively.

8. A remotely controlled assembly for controlling the electrical power to an electrical load, said assembly comprising; female member (28) having a centrally disposed cylindrical receptacle pocket (25) and an integral annular portion about said pocket (25) and a periphery (22) extending substantially perpendicularly from said annular portion with an integral centrally disposed stem (24) extending outwardly from said pocket (25), and a male member (30) having a centrally disposed stem (31) from which extends a centrally disposed cylindrical base (26) and a frustoconical portion (33) extending from said base (26) opposite of said stem (31) and having an annular flange at the end thereof and a centrally disposed pocket (27) for receiving said stem (24) of said female member (28), wherein said male member (30) includes a pair of locating webs (46) extending radially inwardly from said annular flange for aligning said male member (30) with said female member (28), wherein said male member (30) further includes tabs (48), wherein said female member (28) includes grooves (23) on said periphery (22) for mating with said locating webs (46) of said male member (30) for aligning and non-rotatably securing said female member (28) within said male member (30), including first printed circuit board (34) and second printed circuit board (36) for regulating and controlling the amount of electrical power supplied to an electrical load in response to a predetermined radio signal, including notches (37) in said circuit boards (34,36) for mating with said tabs (48) of said male member (30) for mounting and securing said boards (34,36) inside said male member (30), including an internal threadable contact (38) and a flat spring (40) for securing and supplying power to said electrical load, including a threadable electrical contact (42) for securing into a receptacle and a fastener (44) to secure said stem (24) of said female member (28) to said male member (30), includes eyelets (32) for fastening said electrical contacts (42,38) and flat spring (40) to said male member (30) and said female member (28), respectively.

* * * * *